(12) United States Patent
Little

(10) Patent No.: US 6,868,803 B1
(45) Date of Patent: Mar. 22, 2005

(54) HEATED PET ENCLOSURE

(76) Inventor: Ronald B. Little, 181 Hickory Ridge Rd., Florence, MS (US) 39073

(*) Notice: Subject to any disclaimer, the term of this patent is extended or adjusted under 35 U.S.C. 154(b) by 0 days.

(21) Appl. No.: 10/770,236

(22) Filed: Feb. 2, 2004

(51) Int. Cl.[7] ............................................. A01K 1/03
(52) U.S. Cl. ................................. 119/498; 119/482
(58) Field of Search ........................... 119/28.5, 303, 119/482, 498, 500

(56) References Cited

U.S. PATENT DOCUMENTS

| | | | |
|---|---|---|---|
| 2,280,779 A | | 4/1942 | Barragy |
| 2,842,651 A | * | 7/1958 | Neely .......................... 219/530 |
| 3,962,993 A | | 6/1976 | Dattilo |
| D256,734 S | | 9/1980 | Riley |
| 4,257,349 A | | 3/1981 | Carlin |
| 4,332,214 A | | 6/1982 | Cunningham |
| 4,591,694 A | | 5/1986 | Phillips |
| 4,696,260 A | | 9/1987 | Panessidi |
| 5,154,137 A | | 10/1992 | Stanaland |
| D348,958 S | | 7/1994 | McLellan |
| D349,980 S | | 8/1994 | Northrop |
| 5,371,340 A | | 12/1994 | Stanfield |
| D366,541 S | | 1/1996 | Bradburn |
| 5,551,371 A | | 9/1996 | Markey et al. |
| 5,582,135 A | * | 12/1996 | Bellows ....................... 119/168 |
| D379,014 S | | 4/1997 | Woods |
| 6,084,209 A | | 7/2000 | Reusche |
| 6,189,487 B1 | | 2/2001 | Owen |
| 6,338,317 B1 | * | 1/2002 | Smith .......................... 119/482 |
| 6,606,965 B2 | | 8/2003 | Saxe |

* cited by examiner

Primary Examiner—Robert P. Swiatek

(57) ABSTRACT

A heated pet enclosure which allows for a heated area for a pet to lie upon during the cold weather seasons. The shelter utilizes its design to allow for the heating components to be packaged, shipped and displayed at the retail store utilizing minimum space. More specifically, the space which is wasted in a two piece plastic pet enclosure when an inverted roof section is placed in an upright base section, has now been designed and utilized to hold the necessary components for the heated pet enclosure. This new packaging innovation allows the heated pet enclosure to be packaged, shipped and displayed in a single grouping instead of multiple packaging.

19 Claims, 12 Drawing Sheets

HEATED PET ENCLOSURE

BACKGROUND OF THE INVENTION

1. Field of Invention

This invention relates to providing outdoor pets with a comfortable shelter during the winter weather. By integrating the designs of the pet shelter structure and the heating system, the heated pet shelter can be shipped, stored and displayed at the retail stores utilizing a minimum of space.

2. Related Art

Numerous patents have been issued relating to pets and more specifically pet enclosures. Among those are pet water beds and pet heating pads. U.S. Pat. No. 6,084,209 issued to Reusche, teaches that electrical pads tend to create hot spots which are areas of localized heat which can expose the pet to possible burns as well as the possibility of electrical fires due to excessive pad heat, caused by the owners adding additional bedding to keep the animal comfortable. U.S. Pat. No. 4,257,349 issued to Carlin for an anabolic recovery heating unit for small animals, addresses the hot spot issue with electrical heating pads. U.S. Pat. No. 4,332,214 issued to Cunningham, addresses the dangers of the animal chewing the electric pad, its controls or its wiring, and the potential dangers of electrocution or fires. Cunningham further points out that flexible vinyl bladders may easily be punctured by tooth or claw with disastrous results and is a primary criticism of pet water beds. The second criticism is the fact that the motion of flexible water support which humans find so comforting is usually unacceptable to the animal. U.S. Pat. No. 6,189,487B1 issued to Owen addresses the electrocution concern by utilizing a step down transformer to reduce the amount of shock felt by the animal.

U.S. Des. No. 349,980 to Northrop and U.S. Des. No. 366,541 to Bradbum both utilize a two piece design wherein the roof section is inverted and placed in the bottom sections and stacked for shipping and display.

U.S. Pat. No. 5,154,137 to Stanaland also provides a design for a whelping box in which the roof is inverted and placed in the floor section.

U.S. Pat. No. 6,606,965B2 to Saxe, et al., provides for a two piece pet enclosure in which the roof when inverted and inserted in the upright floor section fits snugly and is capable of a greater number of units being stacked together in a stable stack, as compared to the Northrop, Bradburn, and Stanaland designs, which may not be as stable when several sets are stacked one in another.

At the retail level, all of these types of pet shelters are sold and are typically displayed disassembled on the shelf, with the roofs inverted and inserted into the bases. This is an economical way of displaying the product while minimizing the required shelf space.

SUMMARY OF THE INVENTION

My invention provides a simplistic approach to provide an outdoor pet a cozy pet home during the cold weather months of the year. The lack of consumer available, heated pet enclosures has generated this invention.

This invention provides a pet shelter with an insulated floor. The floor will reduce the heat loss from the pet directly to the cold ground, as compared to the typical manufactured plastic molded dog houses. In addition to the added insulation in the floor, a heated, rigid container is designed so that its upper surface is the floor of the heated pet enclosure. This rigid container is filled with a water solution, which is maintained at a selected temperature anywhere between 85 to 100 degrees Fahrenheit, by using an aquarium type heater. A pet mat is placed on the floor of the heated pet enclosure. The below surfaces of the heated tank are well insulated, with the remaining top surface of the tank covered by a fiber filled pet mat. The pet mat acts as an insulating blanket to the heated tank. When the pet lies on the pet mat, it compresses from thick to thin, the R-value goes from a higher R-value to a lower R-value, and the heat stored and being generated in the tank is readily absorbed by the pet. This gives the pet a warm place to lie. No longer is the pet lying on the equivalent of a slightly above freezing or below freezing ground during winter; instead, the pet is now resting upon, for example, a 95 degree Fahrenheit heated floor.

By using a totally submersible aquarium type water heater with its associated thermostat in a rigid plastic tank, several objectives of the invention have been met.

1. Accuracy, and reliability: fish aquariums have very strict temperature requirements which provide very narrow temperature swings, therefore aquarium type heaters must provide accurate temperature control as well as a long operating life.
2. Safety: because the aquarium type heaters have been engineered to operate safely while being submerged in water; by having it internally mounted in the tough rigid plastic tank, a pet cannot bite or claw the heater or control circuitry.
3. Animal comfort: the heat storage characteristics of water assures uniform heat distribution, thereby eliminating the possibility of hot spots.
4. Reserve capacity: in event of a short power outage, the heat in the tank can continue to warm the pet for a couple of hours.
5. Economical to manufacture and market: Basically, the aquarium type heaters are inexpensive as are the rigid plastic tanks, and both are widely available from various manufacturers.
6. Economical to operate: The abovementioned heaters are sized by capacity of the tank; a heater in the 200–300 watt range will suffice to maintain the tank at the desired temperature.

The two piece polymer enclosure design allows for the roof section when inverted to fit tightly in the floor section while providing a designed packing area for storage of the tank and insulating materials. Likewise, the heated tank and the insulating components are designed to fit in these packing areas. By utilizing these design packing areas, between the floor and the inverted roof and the floor inserted in the inverted roof, more units can be stored, shipped and displayed in smaller spaces.

In conclusion, up to now there has not been made available, to the consumer pet industry, a design for a heated pet enclosure which can be manufactured and marketed to the consumer of pet products at a price which is affordable to the consumer and is comparatively competitive to non-heated pet enclosures. This invention fills this void in the consumer pet market.

DETAILED DESCRIPTION OF THE PREFERRED EMBODIMENT

Figure 1:
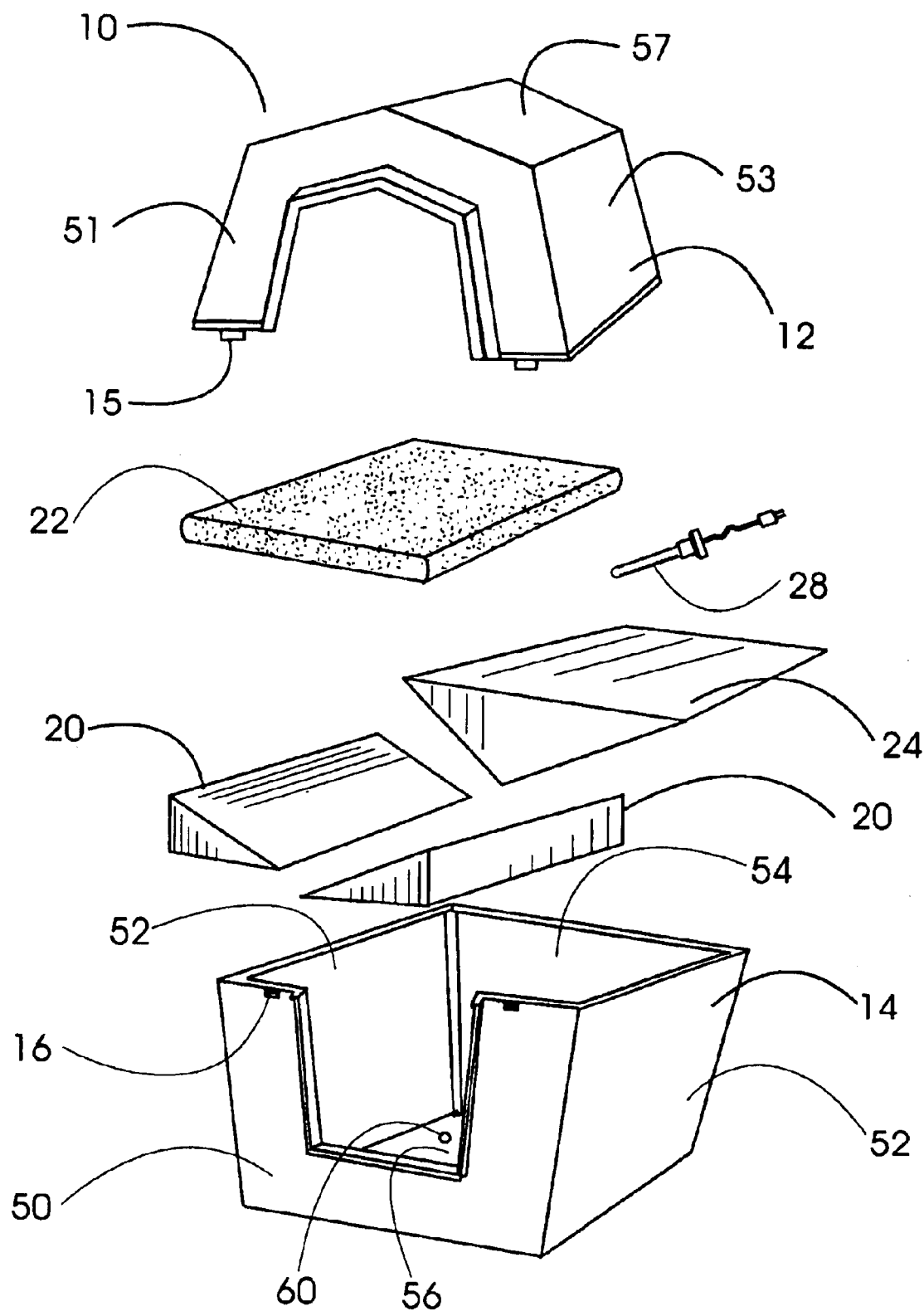
FIG. 1 is an exploded perspective view of the heated pet enclosure.
Figure 2:
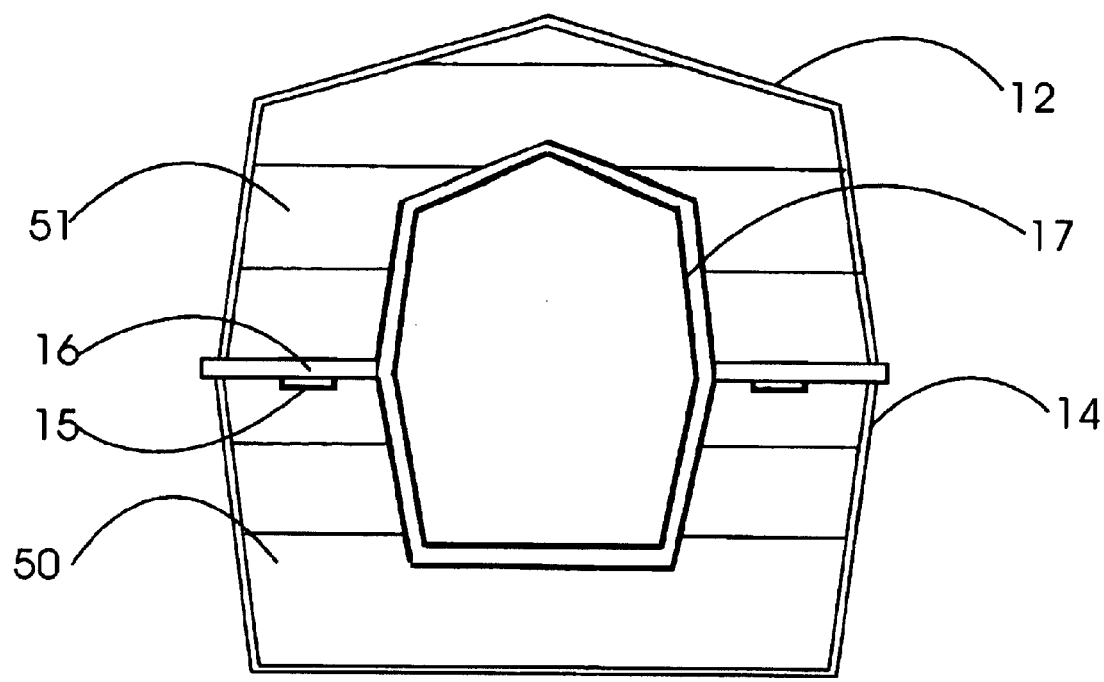
FIG. 2 is the front elevational view of the heated pet enclosure.

Referring now to the drawings in which reference numerals designate like or corresponding parts through several views shown in FIGS. 1–22. The heated pet enclosure according to the present invention is designated by the reference numeral 10. The heated pet enclosure is comprised of a roof section (12) and a floor section (14) containing insulating material (20) which may be built into the bottom (56) of the floor section (14) or may be affixed with the floor section (14). Tank (24) is filled with a solution and a submersible heater (28) is sealed in tank (24). Pet mat (22) is placed on the tank (24). Roof section (12) is placed on floor section (14).

Figure 3:
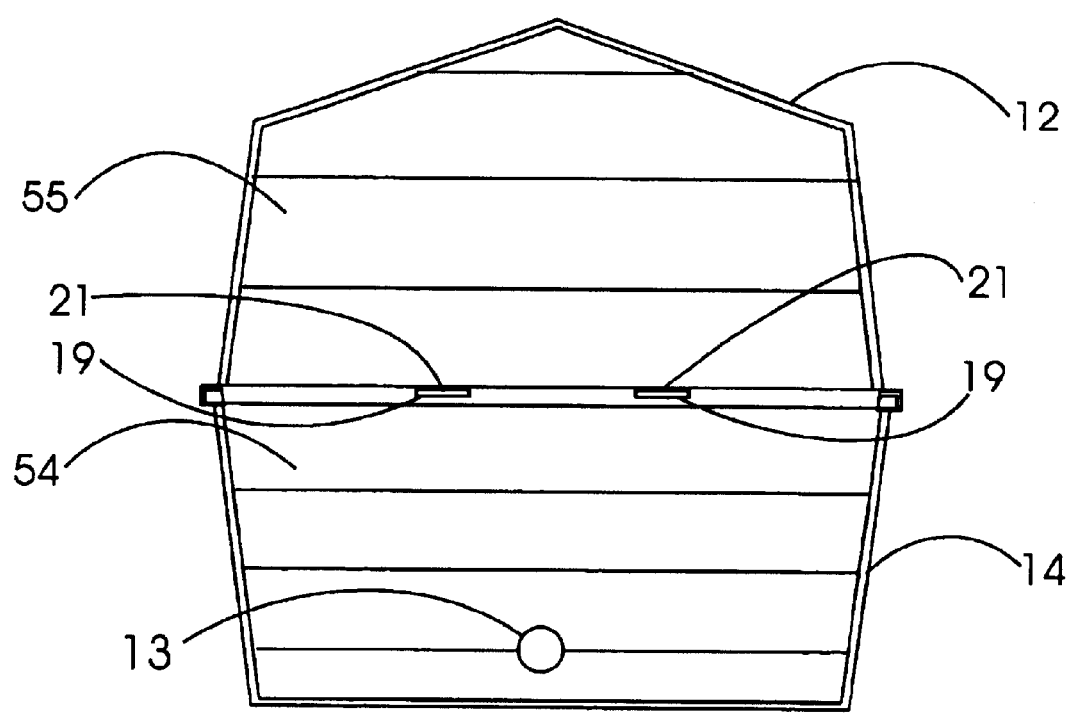
FIG. 3 is the rear elevational view of the heated pet enclosure.

The alignment of the roof on the floor section is shown in FIG. 3, where tabs (19) fit in hinge receptacles (21). Front locking tabs (15) interface with locking receptacle (16) and secure roof to floor section. When the roof section (12) is secured with the floor section (14) an opening (17) is completed in the front wall of the heated pet enclosure (10) (FIG. 2) to allow the passage of the pet. When the pet lies on the pet mat (22) the R value of mat (22) goes from a higher value to a lower value and the heat which is generated and stored in the tank (24) is transferred to the pet. The power to supply submersible heater (28) is supplied with a user supplied electrical cord which is routed through hole (13) in FIG. 3. Drainage of accumulated moisture is provided through holes (60) (FIG. 1) to ground.

Figure 4:
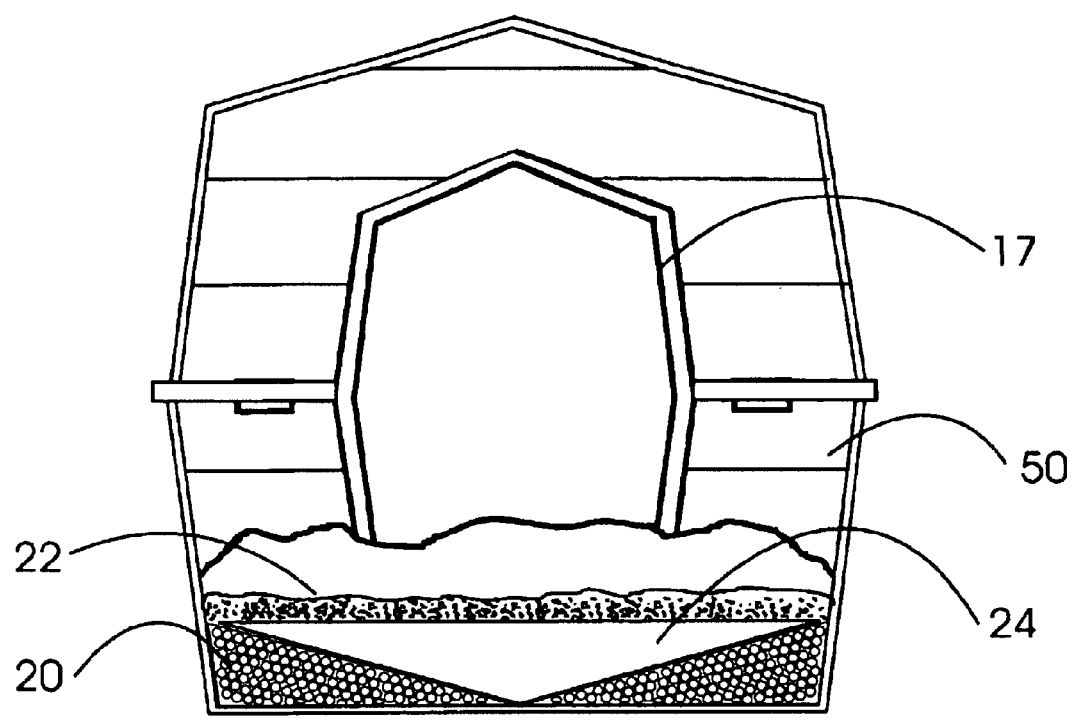
FIG. 4 is a detailed, partial cutaway view of the tank placement in a front elevational view of the heated pet enclosure.
Figure 5:
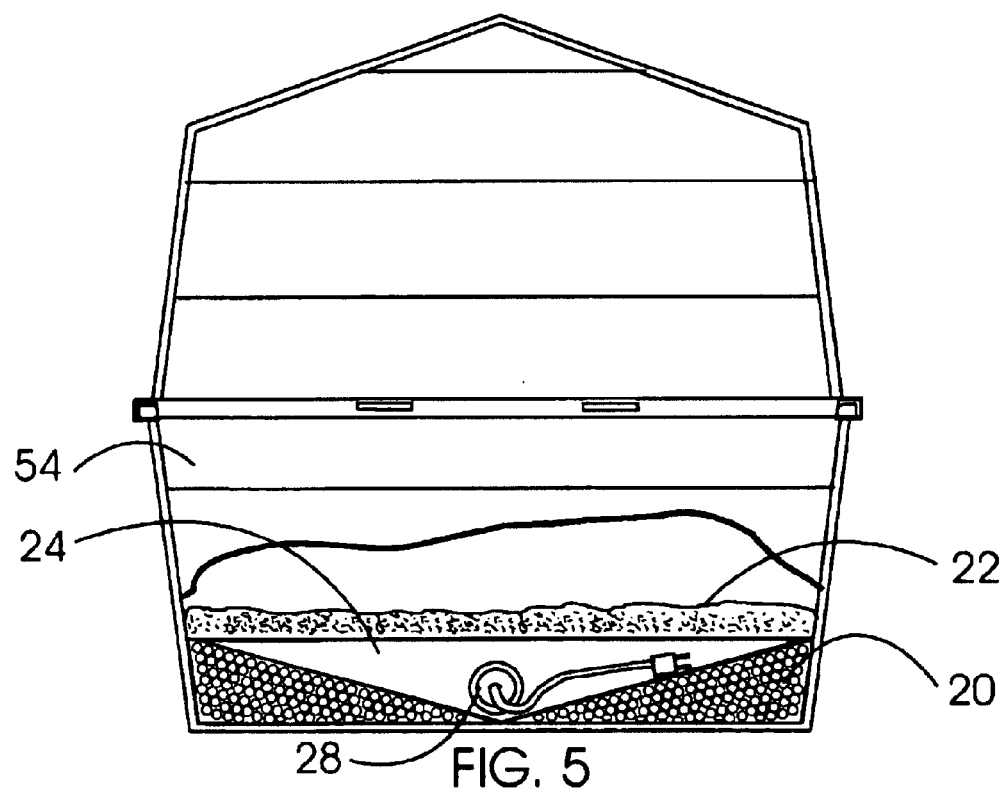
FIG. 5 is detailed, partial cutaway view of the tank placement in a rear elevational view of the heated pet enclosure.
Figure 6:
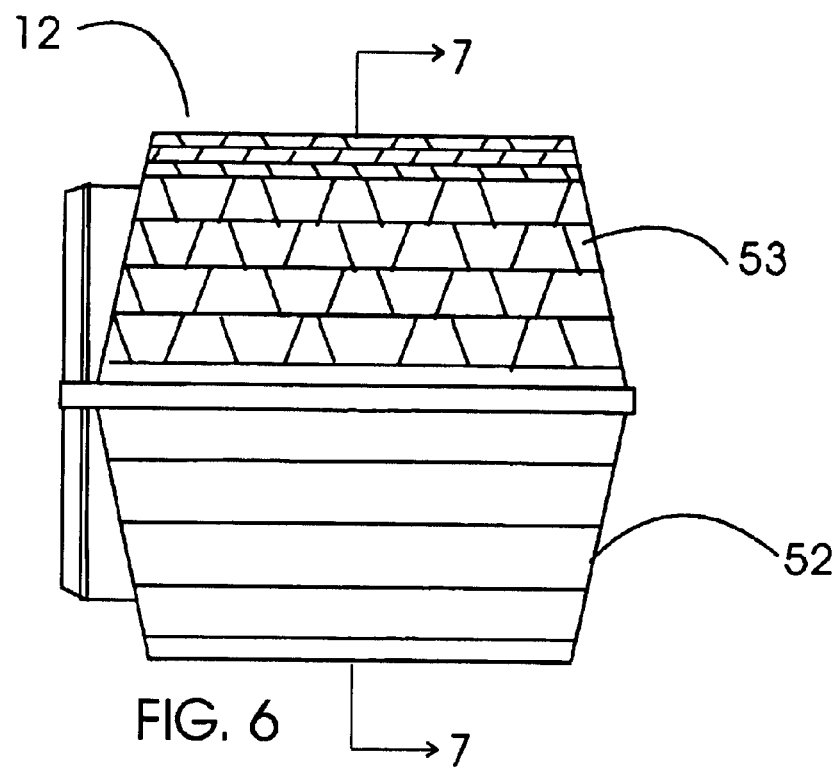
FIG. 6 is a lateral view of the heated pet enclosure.
Figure 7:
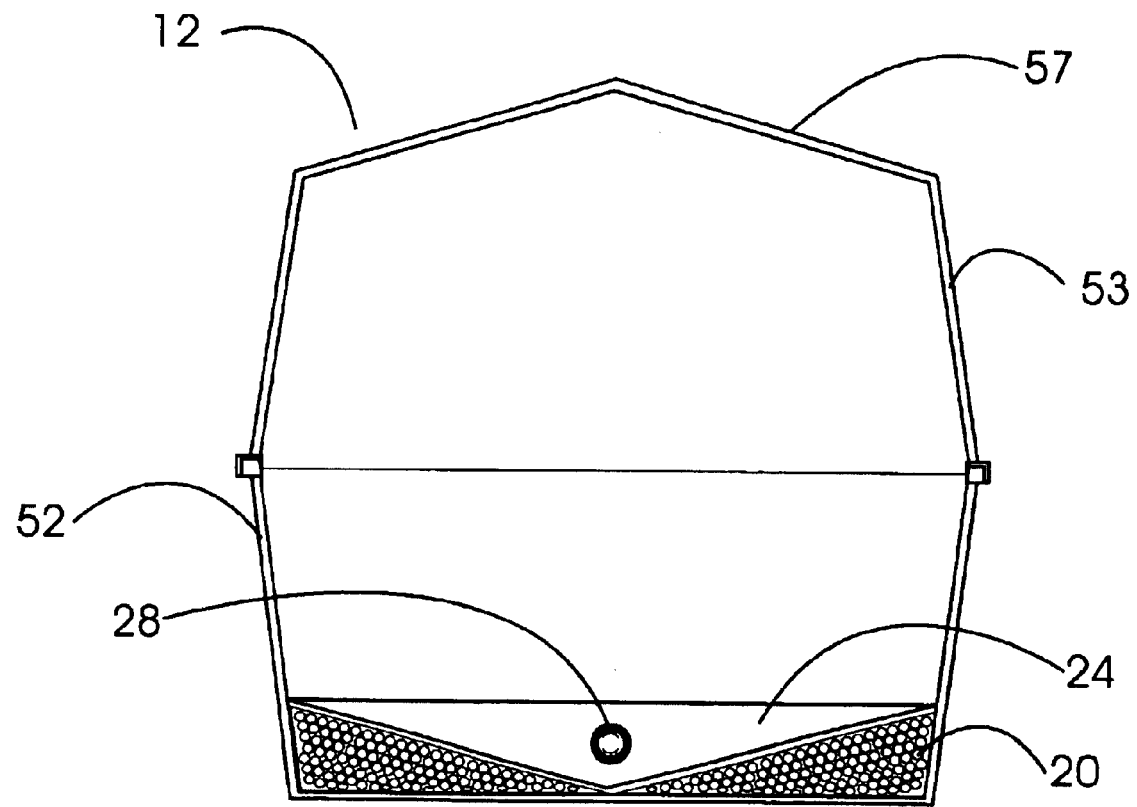
FIG. 7 is a sectional view in the direction of arrows 7—7 shown in FIG. 6.

In FIG. 4, insulating material (20), which is wedge shaped, insulates the tank (24) on its inferior surfaces, thereby minimizing heat loss. Pet mat (22) also minimizes the heat loss through the top surface until the pet compresses the mat and allows the heat transfer. FIG. 5 shows the electrical connection to the submersible heater (28) where a short electrical cord is shown, but the actual design may be just a male receptacle exiting the tank wherein an electrical power cord would plug directly into the tank assembly. A UL listed GFI receptacle will be specified as the only acceptable power source for the heated pet enclosure; this will protect the pet in the event of chewing into the power cord.

The shape and the integration of the pet structure, the heating tank and the insulation materials are viewed in FIGS. 6, 7, 8 and 9. The invention is not limited to this design whereas the shapes and sizes of the above-mentioned components can vary to meet numerous designs. What is shown is that by designing the insulation material (20) and the tank (24) to match the contour of the roof (57) of roof section (12) FIG. 8, the roof when inverted and placed in an upright floor section (14), a stable close fit is provided between the insulation material (20), the roof (57), and the tank (24). The roof section is designed so that the front (51), the sides (53), and the back (55) fit snugly with the front (50), the sides (52), and the back (54), respectively, of the floor section (14), while leaving a designed packing area which will house the tank (24) and the insulation material (20).

Figure 8:
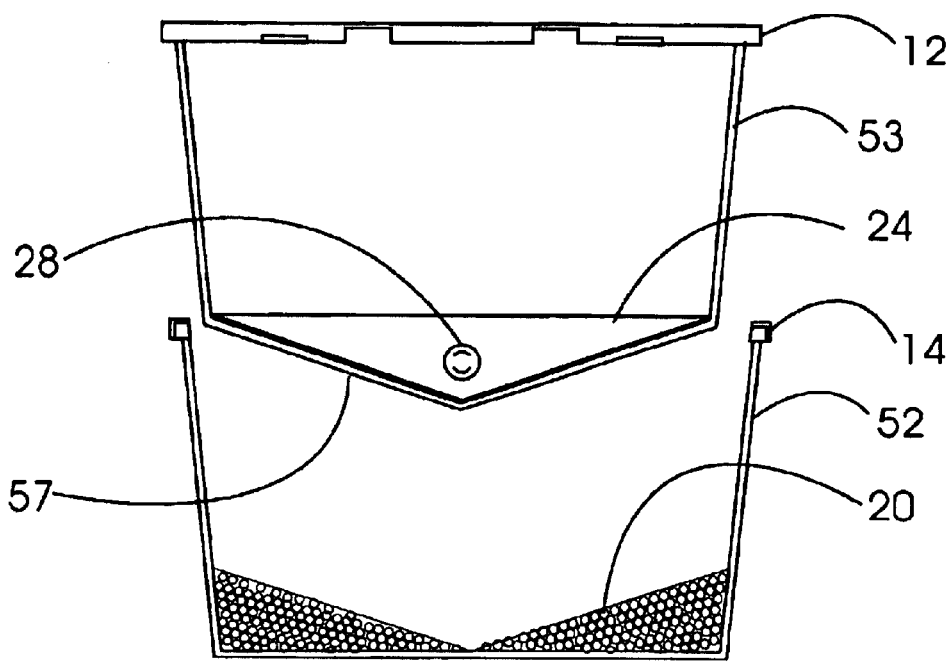
FIG. 8 is a section view of FIG. 7 with the roof section inverted above the floor section.
Figure 9:
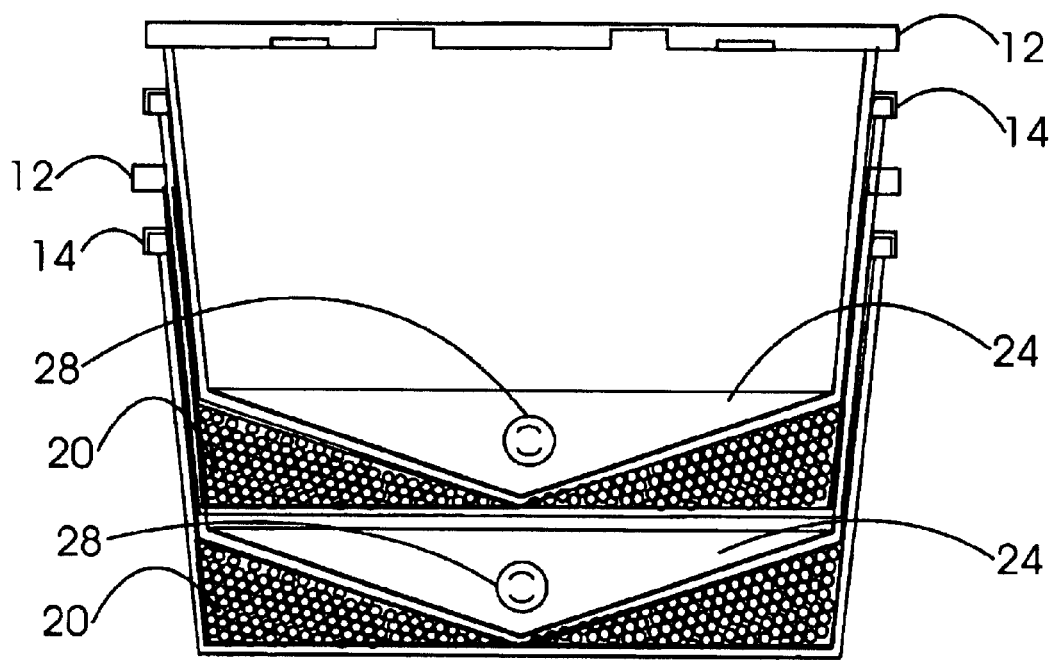
FIG. 9 is a sectional view of FIG. 8 showing two sets of inverted roof and upright base groupings assembled together.
Figure 10:
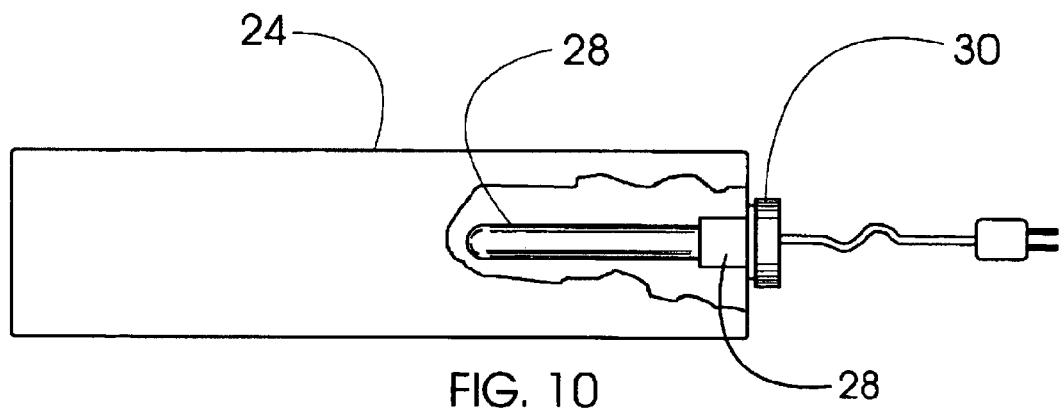
FIG. 10 is a lateral view of the tank with a cutaway section showing the submersible heater.
Figure 11:
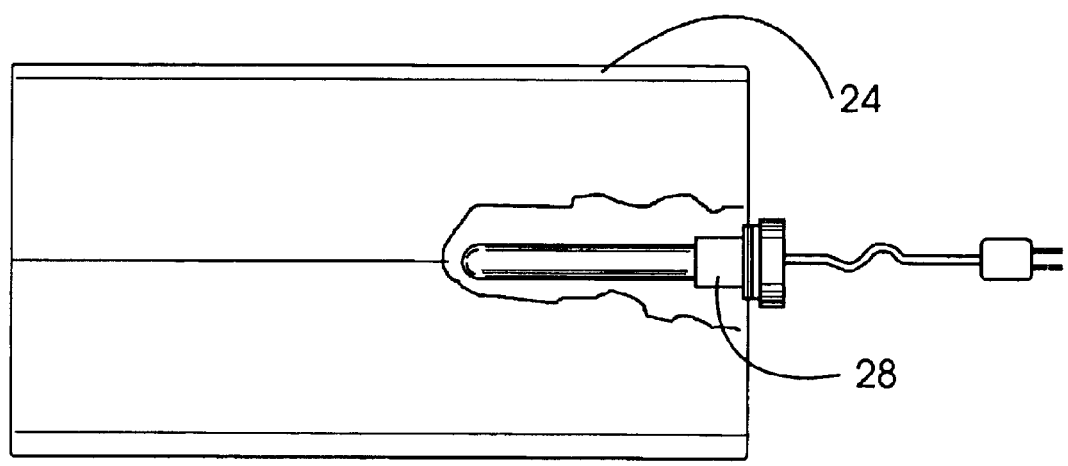
FIG. 11 is a bottom view of the tank with a cutaway section showing the submersible heater.
Figure 12:
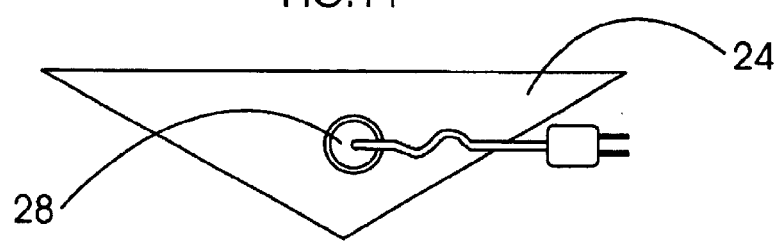
FIG. 12 is a front view of the tank showing the power interface and the sealing cap.
Figure 13:
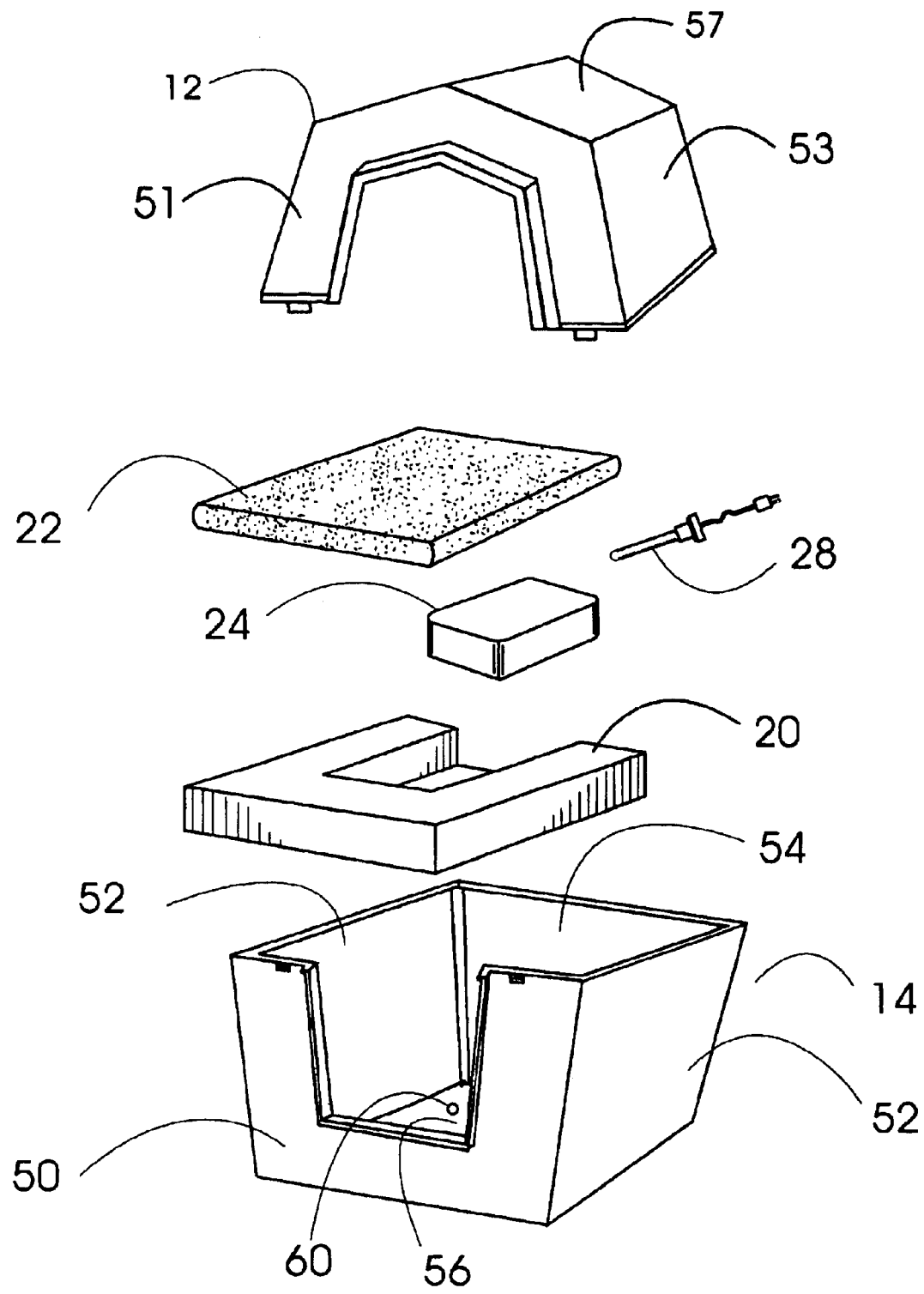
FIG. 13 is an exploded perspective view of the heated pet enclosure.

Utilizing this design concept, viewing FIGS. 8 and 9, the tank (24), with the heater (28) installed, is placed in the inverted roof (12) which, in turn, is set on top of the insulation material (20) which is affixed to the floor section (14). A second floor is placed on top of the tank (24) which is in the first roof section (12). At this point, a second roof section (12) is inverted and placed in the second upright floor section (14), sandwiching the insulation material (20) between the second floor section (14) and the second roof section (12). This results in a very stable column which is efficient to store, ship and display heated pet enclosures (10). FIGS. 10, 11, and 12 show the tank (24) and heater (28). The tank is designed in shape to fit the contour of the roof slope (57) in order to be housed in the roof section (12) and then placed on the insulation material (20), which is designed also to the contour of the roof section (12), for actual use when assembled by the consumer.

Additionally, FIGS. 10, 11 and 12 depict a short electrical cord, but as previously stated, a male receptacle may protrude directly through sealing cap (30) for interface to consumer supplied power cord.

Figure 14:
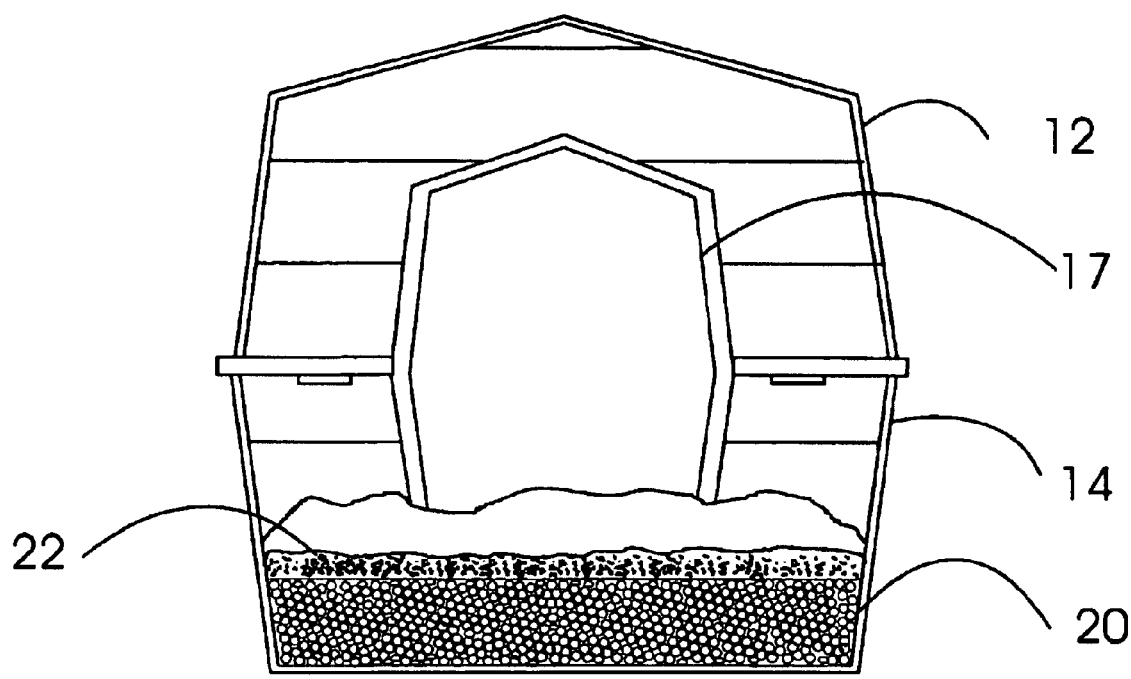
FIG. 14 is a detailed, partial cutaway view of the tank placement in a front elevational view of the heated pet enclosure.
Figure 15:
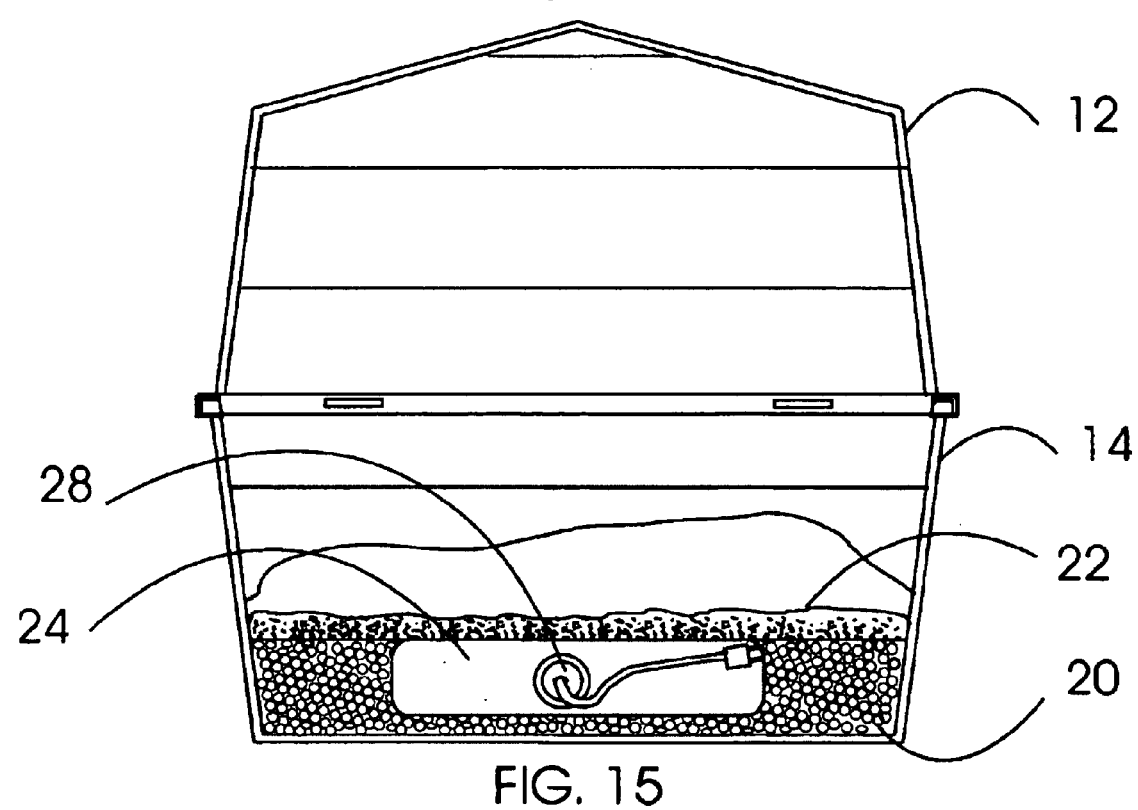
FIG. 15 is a detailed, partial cutaway view of the tank placement in a rear elevational view of the heated pet enclosure.
Figure 16:
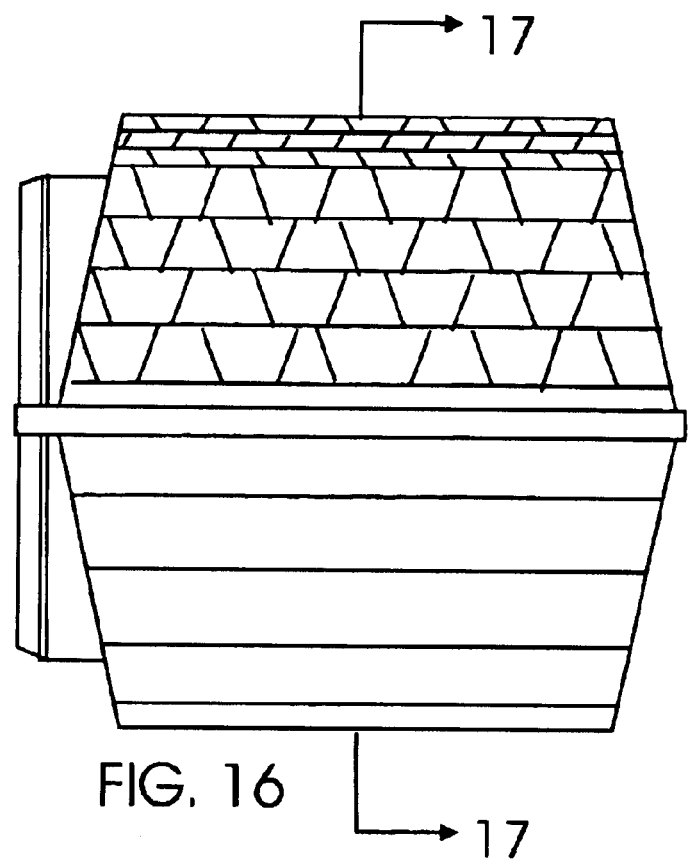
FIG. 16 is a lateral view of the heated pet enclosure.
Figure 17:
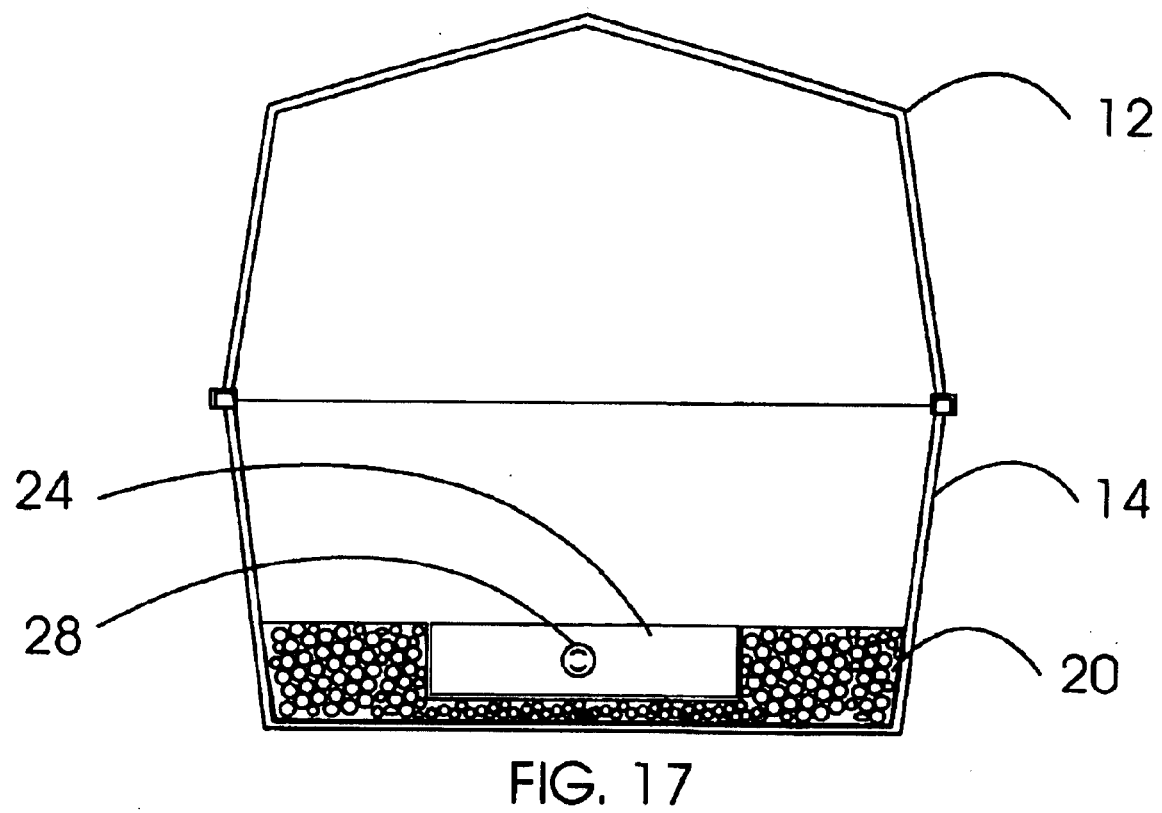
FIG. 17 is a sectional view in the direction of arrows 17—17 shown in FIG. 16.

FIGS. 13 through 25 depict another design in which the heating system is housed between the floor section (14) and the roof section (12), where the tank (24) and the insulation material (20) are not designed to match the contour of the roof section (12). FIGS. 14 and 15 show the placement of the insulation material (20), the tank (24) and the pet mat (22). FIGS. 16 and 17 establish the sectional views which can be used to explain the packing arrangements in FIGS. 18 and 19. The floor section (14) is built taller than the roof section (12) to allow the heating system components, the insulation materials (20), and the tank (24) to fit in this designed packing space.

The roof section is designed so that the front (51), the sides (53), and the back (55) fit closely with the front (50), the sides (52) and the back (54), respectively, of the floor section (14), while leaving a designed area between the tip of the roof and the bottom of the floor section (12) when the roof section is inverted and placed in the upright floor section (14).

Figure 18:
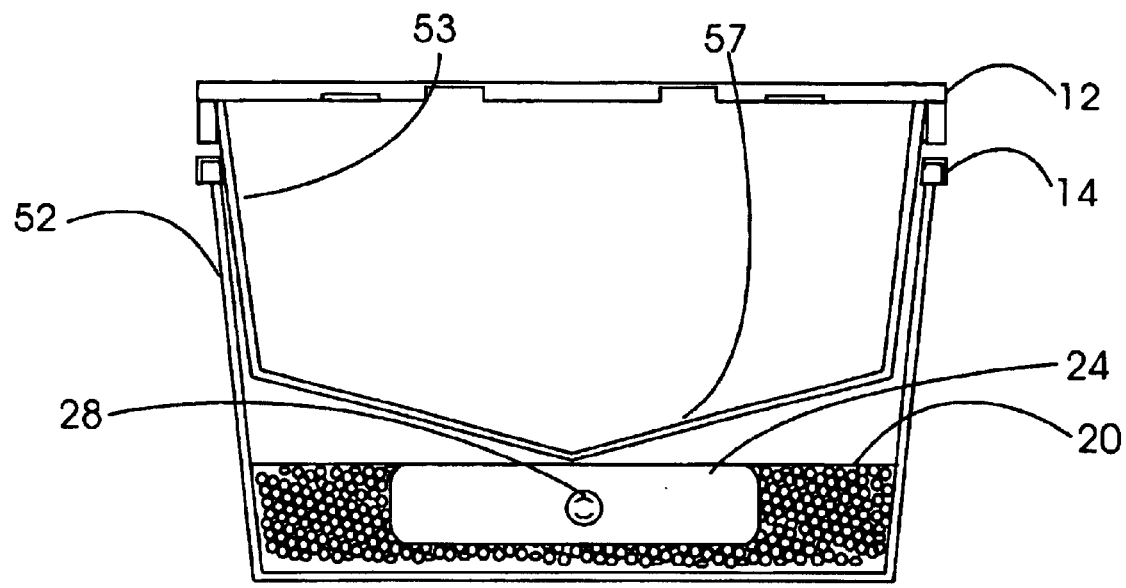
FIG. 18 is the section view of FIG. 17 with the roof section inverted above the floor section.

In FIG. 18, the insulation material (20) and the tank (24) with the submersible heater (28) is installed in place in the bottom of the floor section (14). The inverted roof section (12) is placed in the floor section (14) to make one packed unit.

Figure 19:
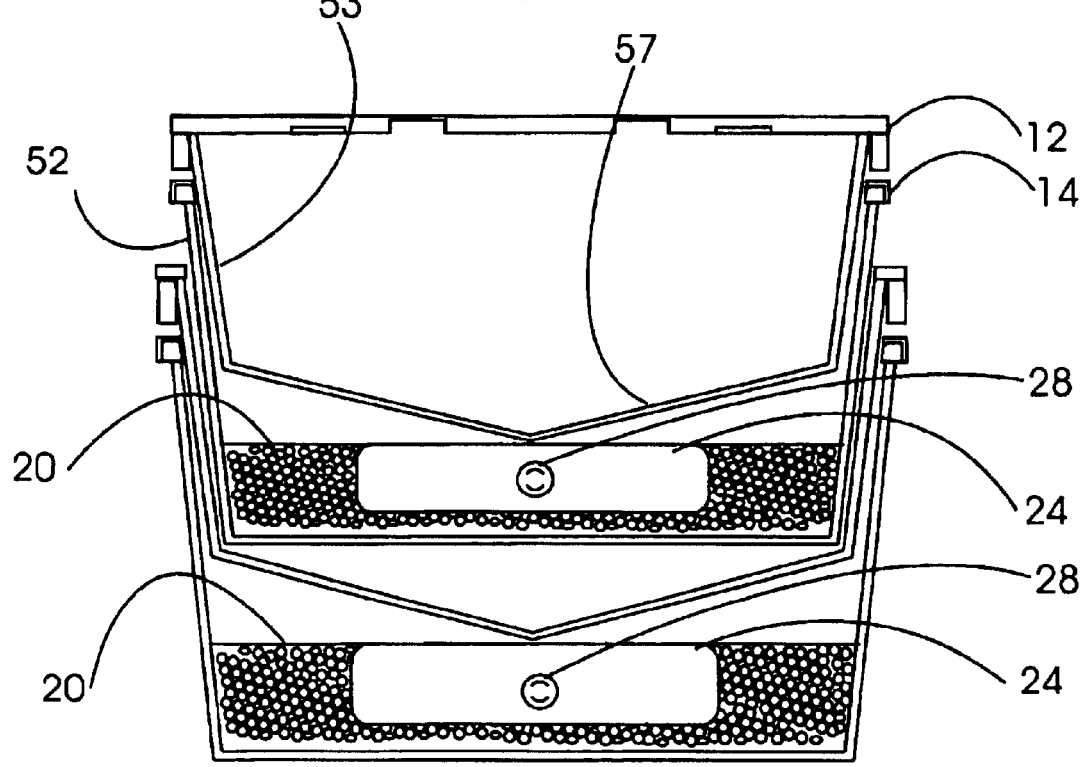
FIG. 19 is a sectional view of FIG. 8 showing two sets of inverted roof and upright base groupings assembled together.

In FIG. 19, multiple packed units are placed together to form a stable column for shipping, storing or for retail display, reducing the packaging costs, storage costs and shipping costs.

Figure 20:
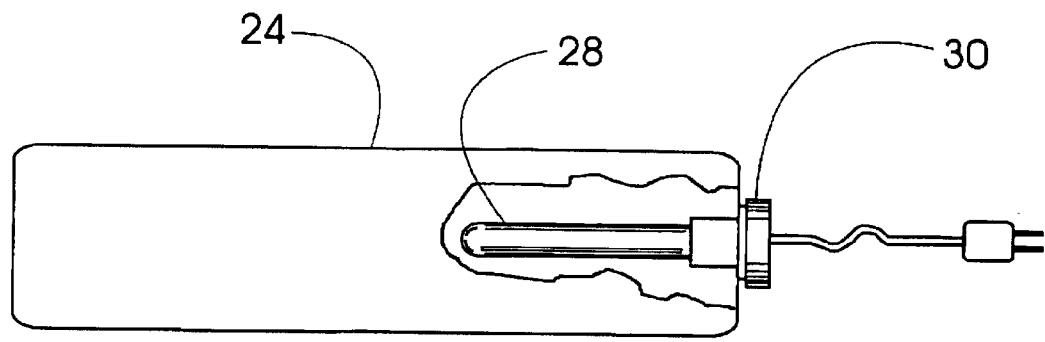
FIG. 20 is a lateral view of the tank with a cutaway section showing the submersible heater.
Figure 21:
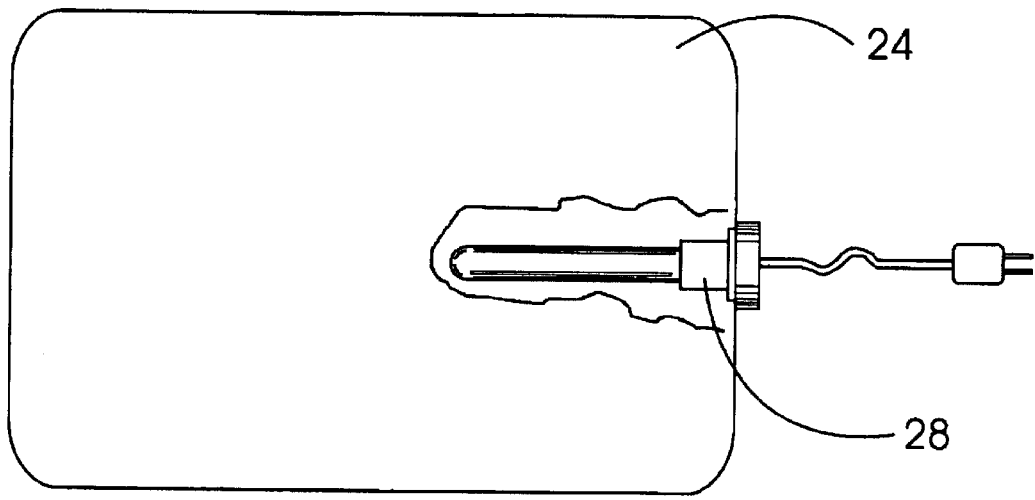
FIG. 21 is a bottom view of the tank with a cutaway section showing the submersible heater.
Figure 22:
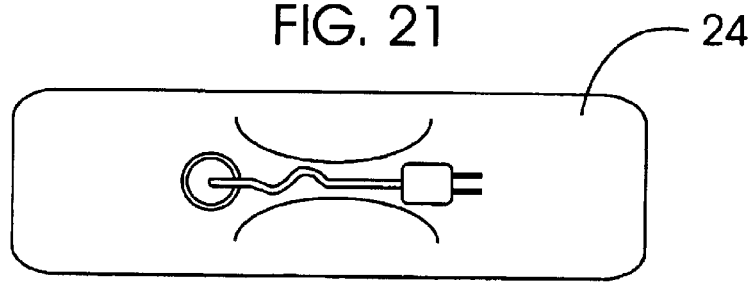
FIG. 22 is a front view of the tank showing the power interface and the sealing cap.
Figure 23:
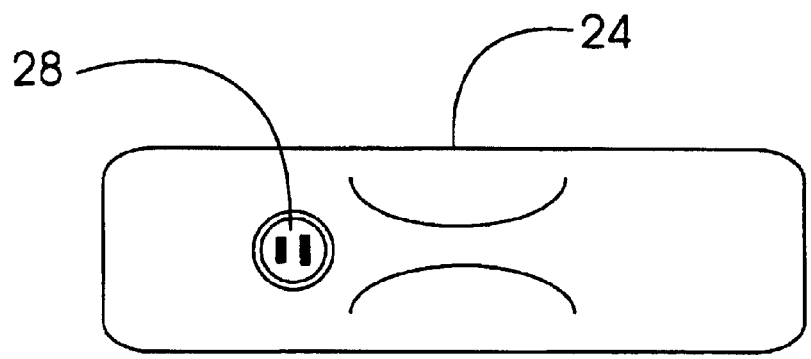
FIG. 23 is a lateral view of the tank with a cutaway section showing the submersible heater.
Figure 24:
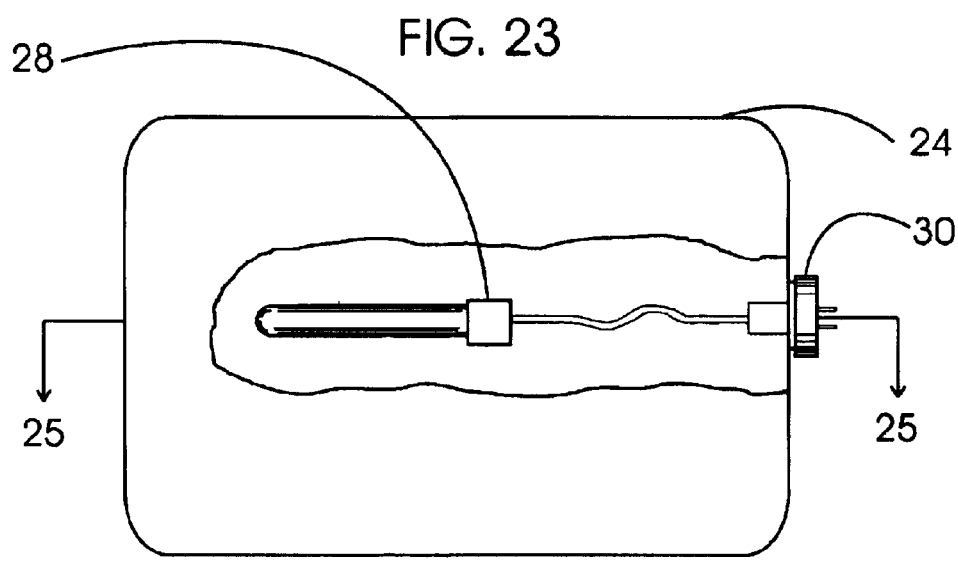
FIG. 24 is a bottom view of the tank with a cutaway section showing the submersible heater.
Figure 25:
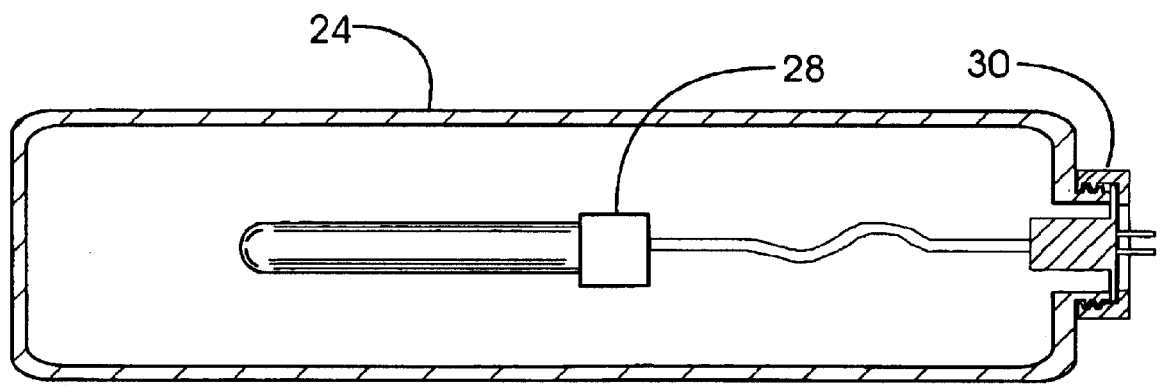
FIG. 25 is a section view of arrows 25—25 shown in FIG. 24.

The tank (24) and the submersible heater are shown in lateral, top and front view, respectively, in FIGS. 20, 21 and 22. Cap (30) provides the seal between the heater (28) and the tank (24). Notice that in FIG. 22 a handle can be incorporated to aid in the filling and placement of the tank. FIGS. 23 through 25 show an alternative design of the submersible heater wherein the power plug is molded together with the tank seal (20).

While the above-detailed description described the preferred embodiment of the present invention, it should be understood that the present invention is susceptible to modification, variation, and alliteration without deviation from the scope and fair meaning of the subjoined claims.

I claim:

1. A heated pet enclosure consisting of:
   a. a floor section containing a bottom, a rear wall, two side walls, and a front wall with an opening in said front wall;
   b. a roof section is comprised of a back wall, two side walls, which are angled in an upward direction and joined to form the roof, and a front wall which contains an opening, said opening communicates with said opening of said floor section for passage of said pet;
   c. a tank molded from a rigid polymer which can be filled with a fluid solution with a high caloric capacity;
   d. a submersible thermostatically controlled electric water heater in which the temperature can be user adjustable; and
   e. insulation material surrounding said tank to prevent loss of heat.

2. The heated pet enclosure in claim 1, wherein said roof section is designed to allow for close fit with said rear wall, said side walls and said front wall of said floor section when said roof section is inverted and placed in said floor section, while creating a designed packing space between said inverted roof section and said floor section.

3. The heated pet enclosure in claim 2, wherein said floor section is designed to allow for close fit with said rear wall, said sidewalls, and said front wall of said roof section, while creating said designed packing space between the outside bottom of said floor section and the interior top of the said roof section when said upright floor section is inserted and placed in said inverted roof section.

4. The heated pet enclosure in claim 3, wherein the form and size of said tank allow for said tank to fit in the designed packing space.

5. The heated pet enclosure in claim 4, wherein the form and size of said insulating material allows fit of said insulating material in the designed packing space between said base and said inverted roof section.

6. The heated pet enclosure in claim 4, wherein said tank is constructed of a rigid plastic and when filled with solution will support the weight of said pet.

7. The heated pet enclosure in claim 6, wherein said tank provides an opening sufficient in size to allow passage of said submersible heater and a means of sealing around said opening allowing for application of external power to said immersion heater.

8. The heated pet enclosure in claim 7, wherein said tank is insulated by said insulation material on selected areas and a pet mat covers the top surface of said tank when placed in said heated pet enclosure.

9. The heated pet enclosure in claim 7, wherein external power source supplied to said immersible heater is routed through an opening in said pet enclosure and connected to said tank.

10. The heated pet enclosure in claim 2, wherein several sets of inverted said roof sections placed in upright said floor sections with said insulation material and said tanks stored in the designed packing spaces, are combined to form a stable column of the heated pet enclosures to minimize space requirements for storage, shipping and display at retail stores.

11. The heated pet enclosure in claim 1, wherein the top surface of said tank when filled and positioned in said floor section will provide a level surface in said heated pet enclosure.

12. The heated pet enclosure in claim 1, wherein said floor section will provide drainage holes for any accumulated moisture within said pet enclosure.

13. The heated pet enclosure in claim 1, wherein any surface area which may be in contact with said pet will be constructed of a waterproof rigid polymer material having sufficient weight-bearing characteristics to support said pet.

14. A heated pet enclosure consisting of:
   a. a floor section containing a bottom, two side walls and a front wall, with an opening in said front wall;
   b. a roof section which is comprised of a back wall, two side walls which are angled in upward direction and joined to form the roof, and a front wall which contains an opening and communicates with said opening of said floor section for passage of said pet;
   c. a tank molded from a rigid polymer, and when filled with a high caloric capacity solution, said tank can support the weight of said pet and provide a level resting surface for said pet;
   d. a submersible thermostatically controlled electric water heater which is sealed and housed in said tank and temperature of said submersible heater is user adjustable;
   e. insulation material which surrounds the surface areas of said tank in which heat transfer is not desired;
   f. a pet mat to cover the resting surface of said heated tank; and
   g. drainage holes to drain any accumulated moisture from said pet enclosure.

15. The heated pet enclosure in claim 14, wherein said floor section and said roof section are designed to fit closely together when said roof section is inverted and inserted into said floor section leaving a designed packing space to house the heating system for the heated pet enclosure, said floor section is also designed to fit closely in said inverted roof section leaving a designed packing space between said inverted roof section and said heating system.

16. The heated pet enclosure in claim 15, wherein repetitive placements of inverted said roof sections into upright said floor sections and upright said floor sections are inserted into inverted said roof sections with said heating system components housed in the designed packing spaces, allow for a stable column of said heated pet enclosures to be stored, shipped and displayed, thereby minimizing the space requirements.

17. The heated pet enclosure in claim 14, wherein the required power is routed through an opening in said heated pet enclosure and is interfaced to said submersible heater located in said tank.

18. The heated pet enclosure in claim 14, wherein the areas exposed to said pet are constructed of durable waterproof materials and said heated pet enclosure provides a method for aligning and securing said roof section to said floor sections.

19. The heated pet enclosure in claim 14, wherein said submersible water heater and said insulation materials are designed in size and shape to fit in designed packing spaces.

* * * * *